US008519085B2

(12) United States Patent
Evans et al.

(10) Patent No.: US 8,519,085 B2
(45) Date of Patent: Aug. 27, 2013

(54) COATING COMPOSITIONS FOR CONTAINERS AND METHODS OF COATING

(75) Inventors: Richard H. Evans, Wexford, PA (US); Robert M. O'Brien, Monongahela, PA (US); Rachael A. Spynda, Wexford, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/351,758

(22) Filed: Jan. 17, 2012

(65) Prior Publication Data

US 2012/0116048 A1 May 10, 2012

Related U.S. Application Data

(60) Continuation of application No. 13/026,862, filed on Feb. 14, 2011, now Pat. No. 8,129,495, which is a division of application No. 11/550,451, filed on Oct. 18, 2006, now Pat. No. 7,910,170.

(60) Provisional application No. 60/727,734, filed on Oct. 18, 2005.

(51) Int. Cl.
*C08G 63/66* (2006.01)

(52) U.S. Cl.
USPC ........... 528/300; 528/271; 528/272; 528/297; 528/298; 528/301; 528/302; 528/304; 525/31; 525/32.2; 525/50

(58) Field of Classification Search
USPC .................. 528/271, 272, 297, 298, 300, 301, 528/302, 303, 304, 305, 306, 307, 308, 308.1, 528/308.3; 525/10, 31, 32.2, 35, 41, 42, 525/50
See application file for complete search history.

(56) References Cited

U.S. PATENT DOCUMENTS

| 2,633,458 | A | 3/1953 | Shokal et al. |
| 3,335,119 | A | 8/1967 | D'Alelio et al. |
| 3,377,406 | A | 4/1968 | Newey et al. |
| 3,477,990 | A | 11/1969 | Dante et al. |
| 3,547,881 | A | 12/1970 | Mueller et al. |
| 3,547,885 | A | 12/1970 | Dante et al. |
| 3,694,407 | A | 9/1972 | Krikorian et al. |
| 3,738,862 | A | 6/1973 | Klarquist et al. |
| 3,862,914 | A | 1/1975 | Anderson et al. |
| 3,948,855 | A | 4/1976 | Perry |
| 4,048,141 | A | 9/1977 | Doorakian et al. |
| 4,073,775 | A | 2/1978 | Matsuo et al. |
| 4,212,781 | A | 7/1980 | Evans et al. |
| 4,247,439 | A | 1/1981 | Matthews et al. |
| 4,423,165 | A | 12/1983 | Harper et al. |
| 4,446,258 | A | 5/1984 | Chu et al. |
| 4,943,359 | A | 7/1990 | Patzschke et al. |
| 4,997,865 | A | 3/1991 | Scherping et al. |
| 5,166,289 | A | 11/1992 | Yezrielev et al. |
| 5,264,469 | A | 11/1993 | Mysliwczyk et al. |
| 5,739,215 | A | 4/1998 | Westerhof et al. |
| 5,891,515 | A | 4/1999 | Dutheil et al. |
| 5,922,817 | A | 7/1999 | Pedersen et al. |
| 6,054,208 | A | 4/2000 | Rega et al. |
| 6,136,927 | A | 10/2000 | Swarup et al. |
| 6,458,468 | B1 | 10/2002 | Moskala et al. |
| 6,495,643 | B1 | 12/2002 | Evans et al. |
| 7,592,047 | B2 | 9/2009 | Evans et al. |
| 2002/0015770 | A1 | 2/2002 | Moretti |
| 2004/0259989 | A1 | 12/2004 | O'Brien et al. |

FOREIGN PATENT DOCUMENTS

| GB | 1513866 A | 6/1978 |
| GB | 2152065 A | 7/1985 |
| JP | 5397083 | 8/1978 |
| WO | 9308154 A1 | 4/1993 |
| WO | 0192366 A1 | 12/2001 |
| WO | 2004090020 A1 | 10/2004 |

OTHER PUBLICATIONS

21 C.F.R. Section 175.300 Resinous and Polymeric Coatings: Retrieved on Apr. 19, 2006. Retrieved from Internet: <URL: http://a257.g.akamaitech.net/7/257/2422/01apr20051500/edocket.access.gpo.gov/cfr_2005 . . . >; 27 pages.
ASTM Designation: D 2196-05, Standard Test Methods for Rehological Properties of Non-Newtonian Materials by Rotational (Brookfield type) Viscometer, published Aug. 2005.
ASTM International, Designation: D 3359-02, Standard Test Methods for Measuring Adhesion by Tape Test, Published Oct. 2002, 7 pages.
ASTM International, Designation: D 5402-93 (Reapproved 1999), Standard Practice for Assessing the Solvent Resistance of Organic Coatings Using Solvent Rubs, Published Jul. 1993, 3 pages.
Guidance for Industry, "Preparation of Food Contact Notifications and Food Additive Petitions for Food Contact Substances: Chemistry Recommendations," Center for Food Safety and Applied Nutrition, Apr. 2002, Retrieved on Apr. 19, 2006. Retrieved from Internet: <URL: http//www.cfsan.fda.gov/~dms/opa2pmnc.html>, 37 pages.
International Search Report dated Sep. 11, 2007 for PCT Application No. PCT/US06/60043 filed Oct. 18, 2006; 2 pages.
Science IP Request Form for search topic Bis-4-hydroxy benzoates of various diols dated Jul. 8, 2005, and results of search, "87876— Glycol Bis(4-hydroxybenzoates)," dated Jul. 13, 2005, 55 pages.

*Primary Examiner* — Frances Tischler

(57) ABSTRACT

This invention provides a coating composition for use on a food-contact surface of a container (e.g., a food or beverage can) that includes a polymer having one or more segments of Formula I:

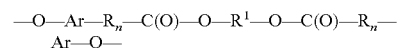

—O—Ar—R_n—C(O)—O—R¹—O—C(O)—R_n—
Ar—O— wherein each Ar is independently a divalent aryl group (i.e., an arylene group) or heteroarylene group; $R^1$ is a divalent organic group; each R is independently a divalent organic group; and n is 0 or 1. Containers comprising the polymer and methods of making such containers are also provided.

21 Claims, No Drawings

COATING COMPOSITIONS FOR CONTAINERS AND METHODS OF COATING

CROSS REFERENCE TO RELATED APPLICATION(S)

This application is a continuation of application Ser. No. 13/026,862 filed on Feb. 14, 2011, now U.S. Pat. No. 8,129,495, which is a divisional of application Ser. No. 11/550,451 filed on Oct. 18, 2006, now U.S. Pat. No. 7,910,170, which claims the benefit of Provisional Application No. 60/727,734 filed on Oct. 18, 2005 by Evans, et al. Each patent application identified above is incorporated herein by reference in its entirety.

BACKGROUND

A wide variety of coatings have been used to coat the surfaces of packaging articles (e.g., food and beverage cans). For example, metal cans are sometimes coated using "coil coating" or "sheet coating" operations wherein a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments.

Many current packaging coatings contain mobile or bound bisphenol A ("BPA") or bisphenol F ("PBF") based materials. Although the balance of scientific evidence available to date indicates that the small trace amounts of these compounds that might be released from existing coatings does not pose any health risks to humans, these compounds are nevertheless perceived by some people as being potentially harmful to human health. Consequently, there is a strong desire to eliminate these compounds from food contact coatings.

From the foregoing, it will be appreciated that what is needed in the art is a packaging container (e.g., a food or beverage can) that is coated with a composition that does not contain extractible quantities of such compounds.

SUMMARY

This invention provides a coating composition for a food-contact surface of a container (e.g., a food or beverage can) that includes a polymer having one or more segments of Formula I:

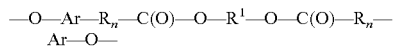
   Ar—O— wherein Ar, R, $R^1$, and n are defined herein below. Preferably, the polymer also includes —$CH_2$—CH(OH)—$CH_2$— segments, which are derived from an oxirane. Thus, preferred polymers include ether linkages.

In one embodiment, the present invention provides a container comprising a food-contact surface, wherein at least a portion of the food-contact surface is coated with a composition including a polymer having one or more segments of Formula I.

In one embodiment, a method of preparing a container (e.g., a food or beverage can) that includes a substrate having food-contact surface is provided. The method includes: providing a coating composition including a liquid carrier and a polymer having one or more segments of Formula I; and applying the coating composition to at least a portion of the food-contact surface of the substrate prior to or after forming a container from the substrate into a container.

In certain embodiments of forming food or beverage cans, a method includes applying a composition comprising a polymer having one or more segments of Formula I to a metal substrate (e.g., applying the composition to the metal substrate in the form of a planar coil or sheet), hardening the composition, and forming the substrate into a food or beverage can or portions thereof. In certain embodiments, applying the composition to a metal substrate includes applying the composition to the metal substrate after the metal substrate is formed into a can or portion thereof.

In certain embodiments, forming the substrate into an article includes forming the substrate into a can end or a can body. In certain embodiments, the article is a 2-piece drawn food can, 3-piece food can, food can end, drawn and ironed food or beverage can, beverage can end, and the like. Suitable metal substrates include steel or aluminum.

In certain embodiments, the composition is substantially free of (mobile and/or bound) Bisphenol A (BPA) [2,2-bis(4-hydroxyphenyl)propane], Bisphenol A diglycidyl ether (BADGE) [2,2-bis(4-hydroxyphenyl)propane bis(2,3-epoxypropyl)ether], Bisphenol F (BPF) [bis(4-hydroxyphenyl)methane], and Bisphenol F diglycidyl ether (BFDGE) [bis(4-hydroxyphenyl)methane bis(2,3-epoxypropyl)ether].

DEFINITIONS

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "substantially free" of a particular mobile compound means that the compositions of the present invention contain less than 100 parts per million (ppm) of the recited mobile compound. The term "essentially free" of a particular mobile compound means that the compositions of the present invention contain less than 5 parts per million (ppm) of the recited mobile compound. The term "completely free" of a particular mobile compound means that the compositions of the present invention contain less than 20 parts per billion (ppb) of the recited mobile compound.

The term "mobile" means that the compound can be extracted from the cured coating when a coating (typically, approximate film weight of 1 mg/cm$^2$) is exposed to a test medium for some defined set of conditions, depending on the end use. An example of these testing conditions is exposure of the cured coating to 10 weight percent ethanol solution for two hours at 121° C. followed by exposure for 10 days in the solution at 49° C.

If the aforementioned phrases are used without the term "mobile" (e.g., "substantially free of BPA") then the compositions of the present invention contain less than the aforementioned amount of the compound whether the compound is mobile in the coating or bound to a constituent of the coating.

The term "food-contact surface" refers to the substrate surface of a container that is in contact with a food or beverage.

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" amine can be interpreted to mean that the coating composition includes "one or more" amines.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

This invention provides a coating composition for use on a food-contact surface of a container (e.g., a food or beverage can) that includes a polymer having one or more segments of Formula I:

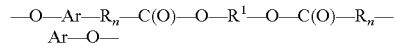

wherein each Ar is independently a divalent aryl group (i.e., an arylene group) or heteroarylene group; $R^1$ is a divalent organic group; each R is independently a divalent organic group; and n is 0 or 1. Any one polymer can have a variety of such segments, which may be the same or different.

Preferably, $R^1$ provides hydrolytic stability to at least one of the adjacent ester linkages (—C(O)—O— and —O—C(O)—), and preferably to both of them. In this context, "hydrolytic stability" means that $R^1$ decreases the reactivity (preferably, by at least half) of the adjacent ester linkage with water compared to a —CH$_2$—CH$_2$— moiety under the same conditions. This can be accomplished by selection of $R^1$ that includes a sterically bulky group in proximity (preferably within two atoms distance) to the oxygen of the ester. The polymer preferably includes more than 70%, more preferably more than 80%, and even more preferably more than 90%, hydrolytically stable ester linkages (based on the total number of ester linkages).

In the segments of Formula I, $R^1$ is a divalent organic group, preferably, having at least 3 carbon atoms, more preferably, at least 4 carbon atoms, even more preferably, at least 5 carbon atoms, and even more preferably, at least 8 carbon atoms. It is envisioned that $R^1$ can be as large as desired for the particular application, which one of skill in the art can readily determine.

In certain preferred embodiments, $R^1$ is of the formula

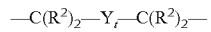

wherein each $R^2$ is independently hydrogen or an organic group (e.g., an alicyclic group or a branched or unbranched alkyl group), Y is a divalent organic group, and t is 0 or 1 (preferably 1). In certain embodiments, each $R^2$ is independently hydrogen.

In certain embodiments, Y can optionally include one or more ether or ester linkages. In certain embodiments, Y is a divalent saturated aliphatic group (i.e., a branched or unbranched alkylene group), a divalent alicyclic group, or a divalent aromatic group (i.e., an arylene group), or combinations thereof.

In certain embodiments, Y is a divalent alkyl group (i.e., an alkylene group), which can be branched or unbranched, preferably having at least 1 carbon atom, more preferably having at least 2 carbon atoms, even more preferably having at least 3 carbon atoms, and even more preferably having at least 6 carbon atoms. In certain embodiments, Y is a divalent alicyclic group, preferably cyclohexylene. It is envisioned that Y can be as large as desired for the particular application, which one of skill in the art can readily determine.

Preferably, Y provides hydrolytic stability to at least one of the ester linkages adjacent $R^1$ in Formula I. This can be accomplished by selection of Y that includes a sterically bulky group that is in proximity (preferably within two atoms) of at least one of the ester oxygen atoms in Formula I.

In certain embodiments, $R^1$ has the formula $—(C(R^2)_2)_s—$ wherein s is at least 2, and preferably, s is at least 3, wherein each $R^2$ is as defined above. Examples of such $R^1$ groups include, for example, neopentylene, butylethylpropylene, and $—CH_2—CH(CH_3)—CH_2—$.

In certain embodiments, Y has the formula

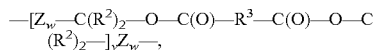

wherein w is 0 or 1, v is 1 to 10, each $R^2$ is as defined above, each $R^3$ is independently a divalent organic group, and each Z is independently a divalent organic group.

In certain embodiments, $R^3$ is a divalent saturated aliphatic group (i.e., branched or unbranched alkylene group), a divalent alicyclic group, an arylene group, or combinations thereof. In certain embodiments, $R^3$ is a (C3-C20)alkylene (branched or unbranched) group or a phenylene group.

In certain embodiments, Z is a divalent saturated aliphatic group (i.e., branched or unbranched alkylene group), a divalent alicyclic group, a divalent aromatic group (i.e., an arylene group), or combinations thereof.

Preferably, Z provides hydrolytic stability to at least one of the ester linkages adjacent $R^1$ in Formula I and/or to an adjacent ester linkage contained within Y. This can be accomplished by selection of Z that includes a sterically bulky group that is in proximity (preferably within two atoms distance) of at least one of the ester oxygen atoms.

In the segments of Formula I, n is preferably 0 (i.e., R is not present). If n is 1 and R is present, however, it is preferably a (C1-C4)alkylene group, and more preferably a (C1-C4)alkylene moiety.

In the segments of Formula I, preferably each Ar has less than 20 carbon atoms, more preferably less than 11 carbon atoms, and even more preferably less than 8 carbon atoms. Preferably, Ar has at least 4 carbon atoms, more preferably at least 5 carbon atoms, and even more preferably, at least 6 carbon atoms.

In certain embodiments, each Ar is a phenylene group. In certain embodiments, each Ar is a phenylene group of the formula $—C_6(R^4)_4—$, wherein each $R^4$ is independently hydrogen, a halogen, or an organic group, and wherein two $R^4$ groups can join to form a ring optionally containing one or more heteroatoms. In certain embodiments, $R^4$ is hydrogen or an organic group, wherein two $R^4$ groups can join to form a 6-membered ring. Preferably, $R^4$ is hydrogen.

Polymers of the present invention optionally can be made from compounds of Formula II:

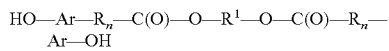

wherein Ar, R, $R^1$, and n are as defined above. Such compounds can be made, for example, by the esterification reaction of one mole of a diol (e.g., HO—$R^1$—OH such as, for example, 1,4-cyclohexane dimethanol, neopentyl glycol, 2-butyl-2-ethyl-1,3-propane diol, or 2-methyl-1,3-propane diol) with two moles of an acid (e.g., 4-hydroxy benzoic acid). Alternatively, such compounds can be made, for example, by the transesterification reaction of one mole of a diol (e.g., 1,4-cyclohexane dimethanol, neopentyl glycol, 2-butyl-2-ethyl-1,3-propane diol, or 2-methyl-1,3-propane diol) with two moles of an ester (e.g., 4-hydroxy methyl benzoate, 4-hydroxy ethyl benzoate, or 4-hydroxy butyl benzoate).

Polymers of the present invention can be prepared by methods that involve advancing the molecular weight of compounds of Formula II. In certain embodiments, compounds of Formula II (e.g., dihydric phenols) can be reacted with a diepoxide to advance the molecular weight. For example, compounds of Formula II (e.g., dihydric phenols) can be reacted with non-BPA and non-BPF based diepoxides much in the same manner that Bisphenol A or Bisphenol F do, to create polymers that can be formulated with crosslinkers and additives for coatings for rigid packaging. For example, compounds of Formula II can be reacted with a diepoxide to form a polymer that includes $—CH_2—CH(OH)—CH_2—$ segments. Alternatively, compounds of Formula II can be reacted with epichlorohydrin to form a diepoxide analog of compounds of Formula II, which can then be reacted with other compounds of Formula II to form a polymer that includes $—CH_2—CH(OH)—CH_2—$ segments. Conditions for such reactions are generally carried out using standard techniques that are known to one of skill in the art or that are exemplified in the Examples Section.

The diepoxide analogs of compounds of Formula II (e.g., glycidyl polyethers of the dihydric phenols) can be prepared by reacting the required proportions of a compound of Formula II (e.g., dihydric phenol) and epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures of 50° C. to 150° C. The heating is continued for several hours to effect the reaction and the product is then washed free of salt and base. Procedures for such reactions are generally well known and disclosed, for example, in U.S. Pat. No. 2,633,458.

As used in the present invention, suitable diepoxides (other than the diepoxide analogs of compounds of Formula II) are BPA- or BPF-free diepoxides, preferably with one or more ether linkages. Suitable diepoxides may be prepared by a variety of processes, for example, by the condensation of a dihydroxy compound and epichlorohydrin. Examples of suitable diepoxides (other than the diepoxide analogs of compounds of Formula II) include, for example, 1,4-cyclohexanedimethanol diglycidyl ether (CHDMDGE), resorcinol diglycidyl ether, neopentyl glycol diglycidyl ether, and 2-methyl-1,3-propandiol diglycidyl ether.

The resultant preferred polymers of the present invention may be epoxy terminated or phenoxy terminated, for example. They may be made in a variety of molecular weights, such as the molecular weights of commercially available BPA-based epoxy materials (e.g., those available under trade designations such as EPON 828, 1001, 1007, 1009 from Resolution Performance Products, Houston, Tex.). Preferred polymers of the present invention have a number average molecular weight ($M_n$) of at least 2,000, more preferably at least 3,000, and even more preferably at least 4,000.

The molecular weight of the polymer may be as high as is needed for the desired application.

Advancement of the molecular weight of the polymer may be enhanced by the use of a catalyst in the reaction of a diepoxide (whether it be a diepoxide analog of Formula II or another diepoxide) with a compound of Formula (II). Typical catalysts usable in the advancement of the molecular weight of the epoxy material of the present invention include amines, hydroxides (e.g., potassium hydroxide), phosphonium salts, and the like. A presently preferred catalyst is a phosphonium catalyst. The phosphonium catalyst useful in the present invention is preferably present in an amount sufficient to facilitate the desired condensation reaction.

Alternatively, the epoxy terminated polymers of the present invention may be reacted with fatty acids to form polymers having unsaturated (e.g., air oxidizable) reactive groups, or with acrylic acid or methacrylic acid to form free radically curable polymers.

Advancement of the molecular weight of the polymer may also be enhanced by the reaction of an epoxy terminated polymer of the present invention with a suitable diacid (such as adipic acid).

The polymers of the present invention can be applied to a substrate from a coating composition that includes a liquid carrier. The liquid carrier may be water, organic solvents, or mixtures of various such liquid carriers. Examples of organic solvents include glycol ethers, alcohols, aromatic or aliphatic hydrocarbons, dibasic esters, ketones, esters, and the like. Preferably, such carriers are selected to provide a dispersion or solution of the polymer for further formulation.

If a water-based system is desired, techniques such as those described in U.S. Pat. Nos. 3,943,187; 4,076,676; 4,247,439; 4,285,847; 4,413,015; 4,446,258; 4,963,602; 5,296,525; 5,527,840; 5,830,952; and 5,922,817, U.S. Patent Application Publication 2004/0259989 A1, and copending U.S. Pat. Application No. 60/620,639 can be used.

Thus, in one embodiment, a water-dispersible polymer may be formed from preformed polymers (e.g., an oxirane-functional polymer having at least one segment of Formula I and an acid-functional polymer) in the presence of a tertiary amine.

In another embodiment, a water-dispersible polymer may be formed from an oxirane-functional polymer having at least one segment of Formula I that is reacted with ethylenically-unsaturated monomers to form an acid-functional polymer, which may then be neutralized, for example, with a tertiary amine. Thus, for example, in one embodiment a water-dispersible polymer having at least one segment of Formula I may be formed pursuant to the acrylic polymerization teachings of U.S. Pat. Nos. 4,285,847 and/or 4,212,781. In another embodiment, acrylic polymerization may be achieved through reaction of ethylenically-unsaturated monomers with unsaturation present in the polymer containing at least one segment of Formula I. See, for example, U.S. Pat. No. 4,517,322 and/or U.S. patent application Ser. No. 11/056,718 by Bariatinsky, et al. for examples of such techniques.

If desired, an acid-functional polymer can be combined with a tertiary amine to at least partially neutralize it prior to reaction with the oxirane-functional polymer having at least one segment of Formula I.

In another embodiment, a polymer containing segments of Formula I and including —$CH_2$—$CH(OH)$—$CH_2$— segments, which are derived from an oxirane, is reacted with an anhydride. This provides acid functionality which, when combined with an amine to at least partially neutralize the acid functionality, is water dispersible.

Preferably, the container is a food or beverage can and the surface of the container is the surface of a metal substrate. The polymer can be applied to a metal substrate either before or after the substrate is formed into a food or beverage can (e.g., two-piece cans, three-piece cans) or portions thereof, whether it be a can end or can body. The polymers of the present invention are suitable for use in food contact situations and may be used on the inside of such cans. They are particularly useful on the interior of two-piece or three-piece can ends or bodies.

A coating composition of the present invention may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom. For example, the composition that includes a polymer of the present invention may optionally include crosslinkers, fillers, catalysts, lubricants, pigments, surfactants, dyes, toners, coalescents, extenders, anticorrosion agents, flow control agents, thixotropic agents, dispersing agents, antioxidants, adhesion promoters, light stabilizers, and mixtures thereof, as required to provide the desired film properties. Each optional ingredient is included in a sufficient amount to serve its intended purpose, but not in such an amount to adversely affect a coating composition or a cured coating composition resulting therefrom.

Preferred compositions are substantially free of mobile BPA, BPF, BADGE, and BFDGE, and more preferably essentially free of these compounds, and most preferably completely free of these compounds. The coating composition is also preferably substantially free of bound BPA, BADGE, BPF, and BFDGE, more preferably essentially free of these compounds, and optimally completely free of these compounds.

It has been discovered that coating compositions using the aforementioned polymer-containing compositions may be formulated using one or more optional curing agents (i.e., crosslinking resins, sometimes referred to as "crosslinkers"). The choice of particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker.

Preferred curing agents are substantially free of mobile BPA, BADGE, PBF, and BFDGE. Suitable examples of such curing agents are hydroxyl-reactive curing resins such as phenoplast and aminoplast.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, and compounds of Formula II.

Aminoplast resins are the condensation products of aldehydes such as formaldehyde, acetaldehyde, crotonaldehyde, and benzaldehyde with amino or amido group-containing substances such as urea, melamine, and benzoguanamine.

Examples of suitable crosslinking resins include, without limitation, benzoguanamine-formaldehyde resins, melamine-formaldehyde resins, etherified melamine-formaldehyde, and urea-formaldehyde resins. As examples of other generally suitable curing agents are the blocked or non-blocked aliphatic, cycloaliphatic or aromatic di-, tri-, or polyvalent isocyanates, such as hexamethylene diisocyanate, cyclohexyl-1,4-diisocyanate, and the like.

The level of curing agent (i.e., crosslinker) required will depend on the type of curing agent, the time and temperature of the bake, and the molecular weight of the polymer. If used, the crosslinker is typically present in an amount of up to 50 wt-%, preferably up to 30 wt-%, and more preferably up to 15 wt-%. These weight percentages are based upon the total weight of the resin solids in the coating composition.

A coating composition of the present invention may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters, acrylics, polyamides, polyethers, and novalacs. Alternatively, such additional polymeric materials or monomers can be reactive with other components of the composition (e.g., an acid-functional polymer). If desired, reactive polymers can be incorporated into the compositions of the present invention, to provide additional functionality for various purposes, including crosslinking Examples of such reactive polymers include, for example, functionalized polyesters, acrylics, polyamides, and polyethers. Preferred optional polymers are substantially free of mobile BPA, BADGE, BPF, and BFDGE.

One preferred optional ingredient is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material. If used, a catalyst is preferably present in an amount of no greater than 3 wt-%, and more preferably no greater than 1 wt-%, based on the weight of nonvolatile material.

Another useful optional ingredient is a lubricant (e.g., a wax), which facilitates manufacture of metal closures by imparting lubricity to sheets of coated metal substrate. Preferred lubricants include, for example, Carnauba wax and polyethylene type lubricants. If used, a lubricant is preferably present in the coating composition in an amount of at least 0.1 wt-%, and preferably no greater than 2 wt-%, and more preferably no greater than 1.5 wt-%, based on the weight of nonvolatile material.

Another useful optional ingredient is a pigment, such as titanium dioxide. If used, a pigment is present in the coating composition in an amount of no greater than 70 wt-%, more preferably no greater than 50 wt-%, and even more preferably no greater than 40 wt-%, based on the total weight of solids in the coating composition.

Surfactants can be optionally added to the coating composition to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

As described above, the coating compositions of the present invention may be useful on food and beverage cans (e.g., two-piece cans, three-piece cans, etc.). Two-piece cans are manufactured by joining a can body (typically a drawn metal body) with a can end (typically a drawn metal end). The coatings of the present invention are suitable for use in food or beverage contact situations and may be used on the inside of such cans. They may be suitable for spray coating, coil coating, wash coating, sheet coating, and side seam coatings (e.g., food can side seam coatings).

Spray coating includes the introduction of the coated composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove any residual carriers (e.g., water or solvents) and harden the coating.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as 2-piece drawn food cans, 3-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as 2-piece drawn food cans, 3-piece food cans, food can ends, drawn and ironed cans, beverage can ends, and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion or other effects to the contained foodstuff. The coatings that function in this role are termed "side seam stripes." Typical side seam stripes are spray applied and cured quickly via residual heat from the welding operation in addition to a small thermal, ultraviolet, and/or electromagnetic oven.

Other commercial coating application and curing methods are also envisioned, for example, electrocoating, extrusion coating, laminating, powder coating, and the like.

In one embodiment the coating composition is an organic solvent-based composition preferably having at least 20 weight percent (wt-%) non-volatile components (i.e., "solids"), and more preferably at least 30 wt-% non-volatile components. In one embodiment the coating composition is an organic solvent-based composition preferably having no greater than 40 wt-% non-volatile components (i.e., "solids"), and more preferably no greater than 30 wt-% non-volatile components. For this embodiment, the non-volatile film forming components preferably include at least 50 weight percent of polymer having segments of Formula I, more preferably at least 55 wt-% of the polymer, and even more preferably at least 60 wt-% of the polymer. For this embodiment, the non-volatile film forming components preferably include no greater than 95 wt-% of polymer having segments of Formula I, and more preferably no greater than 85 wt-% of the polymer.

In one embodiment the coating composition is a water-based composition preferably having at least 15 wt-% non-volatile components (i.e., "solids"). In one embodiment the coating composition is a water-based composition preferably having no greater than 50 wt-% non-volatile components (i.e., "solids"), and more preferably no greater than 40 wt-% non-volatile components. For this embodiment, the non-volatile film forming components preferably include at least 25 wt-% of polymer having segments of Formula I, more preferably at least 30 wt-% of the polymer, and more preferably at least 40 wt-% of the polymer. For this embodiment, the non-volatile film forming components preferably include no greater than 60 wt-% of polymer having segments of Formula I, and more preferably no greater than 70 wt-% of the polymer.

EXAMPLES

The following examples are offered to aid in understanding of the present invention and are not to be construed as limiting the scope thereof. Unless otherwise indicated, all parts and percentages are by weight. The constructions cited were evaluated by tests as follows:

Solvent Resistance

The extent of "cure" or crosslinking of a coating is measured as a resistance to solvents, such as methyl ethyl ketone (MEK) or isopropyl alcohol (IPA). This test is performed as described in ASTM D 5402-93. The number of double-rubs (i.e., one back-and forth motion) is reported.

Global Extractions

The global extraction test is designed to estimate the total amount of mobile material that can potentially migrate out of a coating and into food packed in a coated can. Typically coated substrate is subjected to water or solvent blends under a variety of conditions to simulate a given end-use. Acceptable extraction conditions and media can be found in 21 CFR section 175.300, paragraphs (d) and (e). The current allowable global extraction limit as defined by the FDA regulation is 50 parts per million (ppm).

The extraction procedure used in the current invention is described in 21 CFR section 175.300, paragraph (e) (4) (xv) with the following modifications to ensure worst-case scenario performance: 1) the alcohol content was increased to 10% by weight and 2) the filled containers were held for a 10-day equilibrium period at 100° F. (37.8° C.). These conditions are per the FDA publication "Guidelines for Industry" for preparation of Food Contact Notifications. The coated beverage can was filled with 10 weight percent aqueous ethanol and subjected to pasteurization conditions (150° F. (65.6° C.)) for 2 hours, followed by a 10-day equilibrium period at 100° F. (37.8° C.). Determination of the amount of extractives was determined as described in 21 CFR section 175.300, paragraph (e) (5), and ppm values were calculated based on surface area of the can (no end) of 44 square inches (283.9 $cm^2$) with a volume of 355 milliliters (ml). Preferred coatings give global extraction results of less than 50 ppm, more preferred results of less than 10 ppm, even more preferred results of less than 1 ppm. Most preferably, the global extraction results are optimally non-detectable.

Adhesion

Adhesion testing is performed to assess whether the coating adheres to the coated substrate. The adhesion test was performed according to ASTM D 3359-Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. Testing is accomplished by subjecting the coated substrate to heat ranging from 105° C. to 130° C. and pressure ranging from 0.7 kilograms per square centimeter ($kg/cm^2$) to 1.05 $kg/cm^2$ for a period of 15 minutes to 90 minutes. For the present evaluation, the coated substrate was immersed in deionized water and subjected to heat of 121° C. (250° F.) and pressure of 1.05 $kg/cm^2$ for a period of 90 minutes. The coated substrate was then tested for adhesion and blush as described above. In food or beverage applications requiring retort performance, adhesion ratings of 10 and blush ratings of at least 7 are typically desired for commercially viable coatings.

Crazing—Reverse Impact Resistance

The reverse impact measures the coated substrate's ability to withstand the deformation encountered when impacted by a steel punch with a hemispherical head. For the present evaluation, a coated substrate was subjected to 56 inch-pounds (6.35 N m) of force using BYK-Gardner "overall" Bend and Impact Tester and rated visually for micro-cracking or micro-fracturing—commonly referred to as crazing. Test pieces were impacted on the uncoated or reverse side. A rating of 10 indicates no craze and suggests sufficient flexibility and cure. A rating of 0 indicates complete failure. Commercially viable coatings preferably show slight or no crazing on a reverse impact test.

206 End Fabrication

This test is a measure of fabrication ability of a coating. 206 Ends are formed in a press from coated plate. The ends are evaluated for initial failure. The ends are then soaked in a copper sulfate solution (69 parts deionized water, 20 parts anhydrous copper sulfate, 10 parts concentrated hydrochloric acid, 1 part DowFAX 2A1 surfactant) for 10 minutes. The percentage of un-corroded circumference of the end is recorded.

Food Simulant Tests

The resistance properties of stamped 202 ends of coated plate were evaluated by processing (retorting) them in three food simulants for 60 minutes at 121° C. (250° F.) and 15 pounds per square inch (psi) (1.05 kg/cm$^2$). The three food simulants were deionized water, a 1% by weight solution of lactic acid in deionized water and a solution of 2% sodium chloride and 3% acetic acid by weight in deionized water. An additional simulant, 2% sodium chloride in deionized water, is processed for 90 minutes at 121° C. (250° F.) and 15 psi (1.05 kg/cm$^2$). Adhesion tests were performed according to ASTM D 3359-Test Method B, using SCOTCH 610 tape, available from 3M Company. Adhesion was rated using a 0 to 10 rating scale where a rating of "10" indicates no adhesion failure, a rating of "9" indicates 90% of the coating remained adhered and so on. Blush and corrosion were rated visually.

List of Raw Materials and Ingredients

The following table lists some of the raw materials and ingredients used in the following examples. Alternative materials or suppliers may be substituted as is appreciated to one skilled in the art.

| Raw Material | Supplier | Location |
|---|---|---|
| Para-hydroxy benzoic acid | Acros Organics through Fisher Scientific | Houston, TX |
| Methyl Paraben | Avocado Organics through Alfa-Aesar | Heysham, Great Britain |
| FASCAT 4100 | Arkema | Philadelphia, PA |
| Methyl Isobutyl Ketone | Dow | Midland, MI |
| Methyl Ethyl Ketone | Exxon | Newark, NJ |
| 1,4-Cyclohexane dimethanol-90 (CHDM-90) | Eastman | Kingsport, TN |
| Catalyst 1201 | Deepwater Chemicals | Woodward, OK |
| TYZOR-TOT | Dupont | Wilmington, DE |
| Terephthalic Acid | BP Amoco | Chicago, IL |
| Phosphoric Acid | Aldrich Chemical | Milwaukee, WI |
| VARCUM 29-101 | Durez | Schenactady, NY |
| 1,4-Cyclohexanedimethanol diglycidyl ether | CVC Specialty Chemicals | Maple Shade, NJ |
| Sebacic Acid | Ivanhoe Industries | Mundelein, IL |
| Succinic Anhydride | JLM Marketing | Tampa, FL |
| Butyl Cellosolve | Dow | Midland, MI |

Examples 1 and 3 below describe the synthesis of the bis-4-hydroxy benzoate of 1,4-cyclohexane dimethanol (CHDM). The material was synthesized in two different ways: (1) by direct esterification of 1,4-cyclohexanedimethanol with 4-hydroxy benzoic acid; or (2) by the transesterification of the same diol with methyl-4-hydroxy benzoate. This dihydric phenol made by two synthetic methods was then upgraded (i.e., increased in molecular weight) with 1,4-cyclohexanedimethanol diglycidyl ether (CHDMDGE) as described in Examples 2 and 4.

Each of these materials was then formulated into three-piece food can coatings (see Examples 5 and 6) and the film properties evaluated (see Example 7). The comparative examples are an analogous preparation and formulation where the epoxy portion is an upgrade of CHDMDGE and terephthalic acid to approximately the same epoxy value.

Example 1

Preparation of the Bis-4-Hydroxy Benzoate of CHDM (Direct Esterification

To a 1 liter flask equipped with mechanical stirrer, nitrogen inlet, thermocouple, Dean-Starke trap below a condenser, and a thermocouple to measure the head temperature as distillate comes over, was added 200 parts of CHDM, 383 parts of 4-hydroxy benzoic acid, and 0.5 part of butyl stannoic acid (FASCAT 4100). The mixture was heated to 210° C. over the course of 40 minutes, at which time water began coming over (head temperature of 90° C.). Heating was continued for 6 hours and forty minutes and the temperature was raised to 230° C. At this point most of the material was dumped while hot onto a tray. After cooling, the material was broken up. This material had a melting point of 275-280° C. To a portion of this material was added methyl isobutyl ketone and stirred for 1 hour. The white solid was isolated by vacuum filtration, rinsing well with methyl ethyl ketone, followed by drying overnight in a vacuum oven. This material had a melting point of 280-285° C.

Example 2

Preparation of Upgrade of CHDMDGE and Bis-4-Hydroxy Benzoate of CHDM

To a 1 liter flask equipped with mechanical stirrer, nitrogen inlet, thermocouple, and condenser, was added 152.8 parts of bis-4-hydroxy benzoate made according to the procedure of Example 1, 138.2 parts of CHDMDGE (epoxy value=0.66), 0.17 part of ethyltriphenyl phosphonium iodide (Catalyst 1201), and 9 parts of methyl isobutyl ketone (MIBK). Over the course of about 30 minutes, the material was heated to 144° C. The temperature was raised and heating was continued at 165° C. for about 4.5 hours, at which time 272 parts of butyl ethylene glycol was added. This afforded a material with an epoxy value of 0.021, and solids of 49.0%.

Example 3

Preparation of the Bis-4-Hydroxy Benzoate of CHDM (Transesterification)

A 4-liter two-piece reaction flask was equipped with a stirrer, Dean-Starke tube, reflux condenser, thermocouple, heating mantle, and nitrogen blanket. To the flask 1,792.2 parts of methyl paraben and 849.2 parts of 1,4-cyclohexane dimethanol were added. With the nitrogen blanket flowing in the flask, the contents were heated. At 110° C., 1.4 parts of Tyzor TOT catalyst was added. External heating was continued to increase the temperature. At 171° C., 20 parts of xylene were added to wash material from the flask wall by reflux. Heating was continued to increase the temperature. At 188° C., a distillate was being collected. The temperature was increased to continue collecting distillate. Incrementally, additional xylene was added to aid in the removal of the distillate. When approximately 87% of the expected distillate was collected, half of the contents of the flask was removed. The remaining contents of the flask was washed with MIBK. Solid material was filtered and washed again with MIBK. The product was dried.

Example 4

Preparation of Upgrade of CHDMDGE and Bis-4-Hydroxy Benzoate of CHDM

A 500-ml flask was equipped with a stirrer, reflux condenser, thermocouple, heating mantle and nitrogen blanket. To the flask 47.5 parts of 1,4-cyclohexane dimethanol diglycidyl ether (CHDM-DGE), 52.7 parts of bis-4-hydroxy benzoate of CHDM prepared according to the method of Example 4, 0.1 part of Catalyst 1201, and 11.1 parts of MIBK were added. With the nitrogen blanket flowing in the flask, the contents were heated and reflux prevented achieving a high temperature. Some MIBK was distilled off and a temperature of 172° C. was achieved. The reaction proceeded for 1.5 hours and then was diluted with 101.7 parts MIBK and cooled. The resulting product was at 38.0% solids with an epoxy value of 0.030.

Example 5

Preparation of a 3-Piece Food Coating Using the Polymer of Example 2

A coating composition of the formulation shown in the top of Table 1 was coated onto tin plated steel (ETP) and tin free steel (TFS) with a wire bar to afford a film weight of 6 milligrams per square inch (mgsi) (0.93 mg/cm$^2$) after baking 12 minutes at 405° F. (207° C.) in a forced draft oven.

Example 6

Preparation of a 3-Piece Food Coating Using the Polymer of Example 4

A coating composition of the formulation shown in the top of Table 1 was coated onto tin plated steel (ETP) and tin free steel (TFS) with a wire bar to afford a film weight of 6 milligrams per square inch (mgsi) (0.93 mg/cm$^2$) after baking 12 minutes at 405° F. (207° C.) in a forced draft oven.

Comparative Example 1

Preparation of Upgrade Between CHDMDGE with Terephthalic Acid

To a 1-liter flask equipped with mechanical stirrer, nitrogen inlet, thermocouple, and condenser, was added 511 parts of terephthalic acid, 1025.5 parts of CHDMDGE (epoxy value=0.66), 1.2 parts of ethyltriphenyl phosphonium iodide (Catalyst 1201), and 170.8 parts of MIBK. The material was heated at 130° C. for about 12 hours, at which time 200 parts of MIBK, 680 parts of xylene, and 480 parts of cyclohexanone was added. After filtering the material to remove a small amount of solid terephthalic acid through a 10-micron cone, material was obtained with solids of 49.1, and epoxy value of 0.041.

Comparative Example 2

Preparation of a 3-Piece Food Coating Using the Polymer of Comparative Example 1

A coating composition of the formulation shown in the top of Table 1 was coated onto tin plated steel (ETP) and tin free steel (TFS) with a wire bar to afford a film weight of 6 milligrams per square inch (mgsi) after baking 12 minutes at 405° F. (207° C.) in a forced draft oven.

Example 7

Evaluation of Coatings

Table 1 below shows the formulations and film properties of coated steel. It can be seen that as with the comparative example, these are totally free of any BPA and BADGE.

TABLE 1

Formulations and film properties with materials made from dihydric phenols made by direct esterification

| | Comp. Ex. 2 Parts | Example 5 Parts | Example 6 Parts |
|---|---|---|---|
| Polymer solution | 56.7 | 52.8 | 56.8 |
| Cyclohexanone | 23.8 | 27.8 | 23.8 |
| Aromatic 150 | 2.8 | 2.8 | 2.8 |
| Butyl Cellosolve | 2.0 | 2.0 | 2.0 |
| H$_3$PO$_4$ (35%) | 0.8 | 0.8 | 0.8 |
| VARCUM 29-101(50%) phenolic | 13.9 | 13.9 | 13.9 |
| Evaluations on 6 msi. ETP (cured for 12 minutes at 405° F. (207° C.)) | | | |
| 56" inch/lb Impact Craze/Adhesion | 10/10 | 10/10 | 10/10 |
| MEK Double Rubs | 15-20 | 15-20 | 5-10 |
| Water Retort (90/250) | | | |
| Blush | 10 | 10 | 10 |
| Adhesion-liq/vap | 10/10 | 10/10 | 10/10 |
| 206 End Fabrication | | | |
| Initial | Pass | Pass | Pass |
| 10 minutes in CuSO$_4$, % Retained | 85% | 95% | 90% |
| Salt/Acetic (60/250) Adhesion/Blush/Corrosion | 0/6/6 | 1/9/10 | 2/9/10 |
| Lactic (60/250) Adhesion/Blush/Corrosion | 1/8/2 | 2/6/5 | 1/6/5 |
| Brine (90/250) Adhesion/Blush/Corrosion | 7/9/7 | 9/10/10 | 9/10/10 |
| Evaluations on 6 msi TFS (cured for 12 minutes at 405° F. (207° C.)) | | | |
| Brine (90/250) Adhesion/Blush/Corrosion | 6/8/6 | 5/7/7 | 6/10/9 |

Example 8

This example describes the preparation of the diglycidyl ether of the Bis-4-hydroxy benzoate of 1,4-cyclohexane dimethanol (prepared in Example 1).

To a 500-ml 4-neck round-bottomed flask equipped with a stainless steel stirring shaft connected to a mechanical stirrer, a thermocouple connected to a digital temperature controller, a water cooled condenser, and an inlet for nitrogen gas, add 100 parts of the material prepared in Example 1, and 47.9 parts of epichlorohydrin. Begin stirring with a nitrogen blanket and heat to 8° C. until such time that the majority of the epiclorohydrin has been consumed. At this time add 20.8 parts of sodium hydroxide dissolved in 100 parts of water. Continue heating until the majority of water and sodium chloride is liberated to form the desired diglycidyl ether. Cool the mixture and wash several times with water to remove the sodium chloride. Remove all water to afford the diglycidyl ether of Example 1. The epoxy value of the polymer is predicted to be approximately 0.4 and the epoxy equivalent weight (EEW) should be approximately 255.

Example 9

This example describes the upgrade of the diglycidyl ether of Example 8 with the dihydric phenol of Example 1.

To a 500-ml 4-neck round-bottomed flask equipped with a stainless steel stirring shaft connected to a mechanical stirrer, a thermocouple connected to a digital temperature controller, a water cooled condenser and an inlet for nitrogen gas, add 59.62 parts of the diglycidyl ether formed in Example 8, 40.38 parts of the dihydric phenol of Example 1, 5 parts of methyl isobutyl ketone, and 0.07 part of Catalyst 1201. Begin stirring with a nitrogen blanket and heat to about 140° C. and allow the batch to exotherm no higher than 180° C. After the exotherm, continue heating at 160-165° C. until the epoxy value is measured no higher than 0.03. At this point begin cooling and add 50 parts of butyl cellosolve (butyl cellosolve (ethylene glycol monobutyl ether) and 50 parts methyl isobutyl ketone. This affords a high molecular weight, BPA free resin targeted with solids of 48.7% and a predicted EEW of 3333.

Example 10

This example describes a technique to achieve a water-based system.

A flask was equipped with a stirrer, packed column, Dean-Starke trap, reflux condenser, thermocouple, heating mantle and nitrogen blanket. To the flask, 809.8 parts sebacic acid and 1283.0 parts CHDM-90 (90% cyclohexane dimethanol in water) were added. Under a nitrogen blanket, the contents were heated to distill the water from the CHDM-90. At 165° C., 1.96 parts FASCAT 4100 was added. The temperature was increased to 220° C. to remove water. A sample of the batch was tested and found to have an acid number of 0.5. The remainder of the batch was re-weighed and to 1711.7 parts of this material were added 1040.2 parts of para-hydroxy benzoic acid. The batch was heated to 230° C. to remove water. To aid in the removal of water, xylene was added incrementally. After two days of water removal, 1.04 parts FASCAT 4100 was added to aid in the reaction. The reaction was held an additional 5 hours and then considered complete.

The above material (1915.2 parts) was placed in a flask along with 823.8 parts ERISYS GE-22 (cyclohexanedimethanol diglycidyl ether, available from CVC Specialty Chemicals), 84.8 parts methyl isobutyl ketone, and 2.63 parts Catalyst 1201. The temperature was set at 170° C. and the contents heated. After three hours at temperature, the epoxy value of the material was 0.003. The batch was adjusted to have 2684.2 parts of this material in the flask. Added to the flask were 145.0 parts methyl isobutyl ketone and 294.7 parts succinic anhydride. The temperature was maintained at 120-135° C. for two hours. After the two hour hold, 124.8 parts deionized water and a premix of 214.2 parts dimethyl ethanol amine (DMEA) with 265.8 parts deionized water was added. Then 6325.8 parts deionized water was added. The material was cooled, resulting in a product with 26.4% solids, an acid number of 71.9, a pH of 7.7, and a Number 4 Ford viscosity of 15 Seconds.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of making a polymer, comprising:
providing a compound of Formula II:

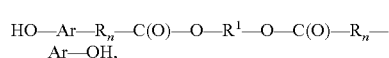

wherein:
each Ar is independently a divalent aryl group or heteroarylene group;
each R is independently a divalent organic group;
$R^1$ is a divalent organic group; and
n is 0 or 1; and
reacting the compound of Formula II with a BPA- or BPF-free diepoxide having one or more ether linkages to form a polymer.

2. The method of claim 1, wherein the BPA- or BPF-free diepoxide comprises a condensation reaction product of a dihydroxy compound and epichlorohydrin.

3. The method of claim 1, wherein the compound of Formula II is the esterification reaction product of one mole of a diol with two moles of an acid.

4. The method of claim 3, wherein the diol is 1,4-cyclohexane dimethanol, neopentyl glycol, 2-butyl-2-ethyl-1,3-propane diol, or 2-methyl-1,3-propane diol.

5. The method of claim 4, wherein the acid is 4-hydroxy benzoic acid.

6. The method of claim 1, wherein the compound of Formula II comprises the transesterification reaction product of one mole of a diol with two moles of an ester.

7. The method of claim 6, wherein the diol is 1,4-cyclohexane dimethanol, neopentyl glycol, 2-butyl-2-ethyl-1,3-propane diol, or 2-methyl-1,3-propane diol, and the ester is 4-hydroxy methyl benzoate, 4-hydroxy ethyl benzoate, or 4-hydroxy butyl benzoate.

8. The method of claim 1, wherein each Ar is independently a phenylene group.

9. The method of claim 1, wherein each Ar is independently a phenylene group of the formula —$C_6(R^4)_4$—, wherein each $R^4$ is independently hydrogen, a halogen, or an organic group, wherein two $R^4$ groups can optionally join to form a ring optionally containing one or more heteroatoms.

10. The method of claim 1, wherein $R_1$ includes at least 3 carbon atoms.

11. The method of claim 1, wherein $R_1$ includes at least 8 carbon atoms.

12. The method of claim 1, wherein $R^1$ provides hydrolytic stability to at least one of the adjacent ester linkages.

13. The method of claim 1, wherein $R^1$ is —$C(R^2)_2$—$Y_t$—$C(R^2)_2$—, and wherein each $R^2$ is independently hydrogen or an organic group, Y is a divalent organic group, and t is 0 or 1.

14. The method of claim 13, wherein Y includes one or more ether or ester linkages.

15. The method of claim 1, wherein $R^1$ has the formula $-(C(R^2)_2)_s-$ wherein s is at least 2, wherein each $R^2$ is independently hydrogen or an organic group.

16. The method of claim 1, wherein n is 0.

17. The method of claim 1, wherein the polymer has a number average molecular weight of at least 2,000.

18. The method of claim 1, wherein the polymer is epoxy or phenoxy terminated.

19. The method of claim 1, wherein the polymer is a water-dispersible polymer.

20. The method of claim 1, wherein the polymer is substantially free of BPA, BADGE, BPF, and BFDGE.

21. A method of making a polymer, comprising:
   providing a compound of Formula II:

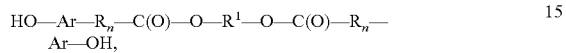

wherein:
      each Ar is independently a phenylene group;
      each R is independently a divalent organic group;
      $R^1$ is a divalent organic group; and
      n is 0 or 1; and
   reacting the compound of Formula II with a BPA- or BPF-free diepoxide to form a polymer, wherein the BPA- or BPF-free diepoxide includes one or more ether linkages and is a condensation product of a dihydroxy compound and epichlorohydrin.

* * * * *